V. E. & R. G. NELSON.
METALLIC PACKING.
APPLICATION FILED APR. 18, 1912. RENEWED JUNE 11, 1913.

1,068,157.  Patented July 22, 1913.

WITNESSES:
Richard Alspas.
Selene McDonald.

INVENTORS
Victor E. Nelson
Reynold G. Nelson
BY
ATTORNEY.

UNITED STATES PATENT OFFICE.

VICTOR E. NELSON AND REYNOLD G. NELSON, OF DETROIT, MICHIGAN, ASSIGNORS, BY DIRECT AND MESNE ASSIGNMENTS, OF FORTY-NINE ONE-HUNDREDTHS TO ALFRED F. HARROW AND FIFTY-ONE ONE-HUNDREDTHS TO VICTOR E. NELSON, BOTH OF DETROIT, MICHIGAN.

METALLIC PACKING.

1,068,157.      Specification of Letters Patent.      Patented July 22, 1913.

Application filed April 18, 1912, Serial No. 691,657. Renewed June 11, 1913. Serial No. 773,140.

*To all whom it may concern:*

Be it known that we, VICTOR E. NELSON and REYNOLD G. NELSON, citizens of the United States, residing at Detroit, county of Wayne, State of Michigan, have invented a certain new and useful Improvement in Metallic Packing, and declare the following to be a full, clear, and exact description of the same, such as will enable others skilled in the art to which it pertains to make and use the same, reference being had to the accompanying drawings, which form a part of this specification.

This invention relates to metallic packings for rotating or reciprocating shafts, piston rods and the like and has for its object a device for the purpose that is simple and durable in construction and in which the liability of disarrangement is reduced to a minimum.

A further object is a device of the character stated that is very compact in form occupying but small space longitudinal of the shaft, and that is particularly adaptable for use in situations in which it may be subjected to comparatively high degrees of heat.

A further object is a packing that will conform to the irregularities of the shaft or rod, and therefore one that is particularly adapted for use in a cylinder, or the like in which high pressure is evolved as in the gas engine shown in our application, Serial No. 677,427, filed February 14, 1912.

These and further objects of the invention are hereinafter more fully described and claimed and shown in the accompanying drawings in which—

Figure 1:
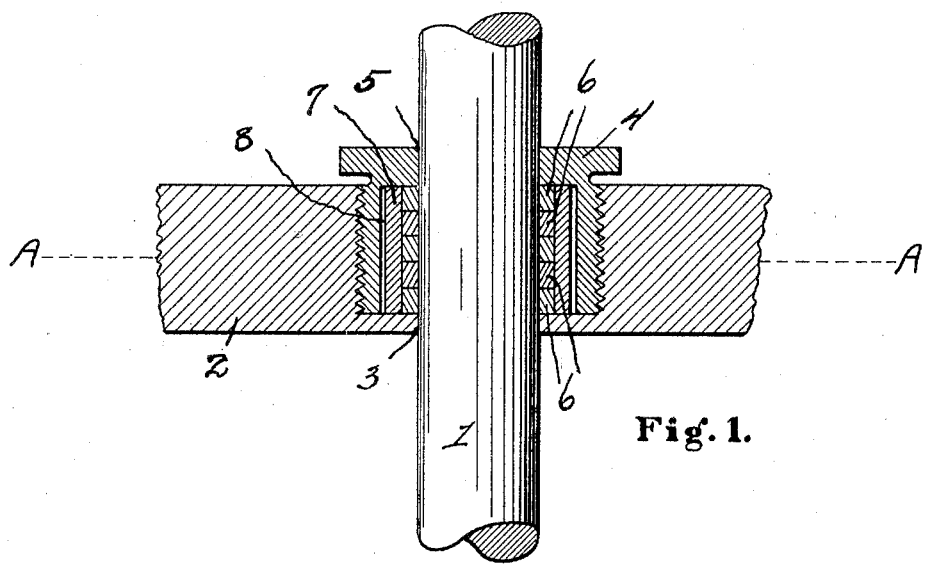
Figure 2:
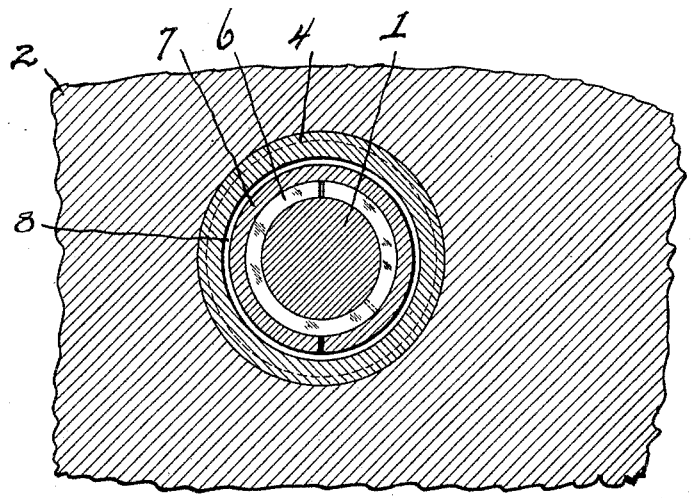

Figure 1, is a vertical section of the stuffing-box embodying our invention. Fig. 2, is a section on line A—A of Fig. 1.

Similar characters refer to similar parts throughout the drawings and specification.

1 is representative of any suitable rotating or reciprocating shaft or piston rod, and 2 is to be considered representative of any cylinder head, or like wall in which the rod is mounted. The head 2 is recessed and the rod passes through an aperture 3 in the bottom of the recess which is slightly greater in diameter than the rod, and within the recess is a chambered nut 4 having an aperture 5 therethrough similar to the aperture 3, and in alinement therewith. The chamber in the nut has a greater diameter than the rod, and within the chamber and in contact with the rod are a series of split rings 6 of spring material. The inner diameter of the rings is less than the diameter of the rod and when placed on the rod they tend to contract and therefore tightly grip the rod, and being of spring material they increase or decrease in diameter in accordance with the inaccuracies in the form of the rod and are at all times in contact therewith. The rings are so positioned on the rod that the open ends of any one ring are not adjacent to the open ends of any contiguous ring. Encircling the rings 6 is a ring 7, whose length is equal to the combined length of the series of rings 6. The ring 7, is also a split ring formed of spring material whose inner diameter is less than the outer diameter of the rings 6. Therefore, when in place as shown in Fig. 1, it is closely in contact with the rings 6 and increases and decreases in diameter in like manner and simultaneously with the rings 6, as heretofore described. The chamber 8 in the nut 4 within which the rings are located is greater in diameter than the outer diameter of the ring 7, thus allowing free play for the diametrical changes in the rings, and the chamber is of such length as to hold the rings firmly from displacement, longitudinally of the rod, but does not so bindingly engage them as to prevent the diametrical alteration thereof. The rings may be held in their proper relative position by means of dowel pins such as are ordinarily used for like purpose but not shown in the drawings.

What we claim and desire to secure by Letters Patent of the United States is—

1. A compound packing ring for shafts etc., comprising a plurality of split metal rings of substantially the same material and structure whose normal diameter is less than the diameter of the shaft and so disposed that the points of division in any two contiguous rings are not adjacent to each other, and a single split metal ring, inclosing the plurality of rings, whose inner diameter is normally less than the outer diameter of the rings.

2. A metallic packing for shafts, rods, etc., comprising a plurality of split rings formed of spring metal whose normal inner diameter is less than the diameter of the shaft, and a single split ring of spring metal inclosing said plurality of rings.

3. A metallic packing for shafts, rods etc., comprising a plurality of split rings formed of spring metal whose normal inner diameter is less than the diameter of the shaft, a single split ring of spring metal, inclosing said plurality of rings, whose normal inner diameter is less than the outer diameter of said plurality of rings, said rings being so disposed that the points of division therebetween are not adjacent to each other, and means for maintaining the rings in their relative position.

4. The combination with the shaft or rod and a packing box, of a chambered nut on the shaft within the box, a plurality of split metal rings on the shaft within the chambered nut, the inner diameter of the rings being normally less than the diameter of the shaft, and a single split metal ring inclosing the plurality of rings, whose normal inner diameter is less than the outer diameter of the plurality of rings, the diameter of the chamber within the nut being greater than the outer diameter of the single ring.

5. The combination with a shaft or rod and a packing box, of a chambered container on the shaft within the box, a plurality of split rings of spring material on the shaft within the container, the inner diameter of the rings being normally less than the diameter of the shaft, and a single split ring of spring material, inclosing the plurality of the rings, whose normal inner diameter is less than the outer diameter of the plurality of rings.

6. A stuffing-box comprising a chambered container, a metallic packing within the chamber comprising a plurality of split rings of spring metal whose inner diameter is normally less than the diameter of the rod on which they are to be placed, and a single split ring of spring metal, inclosing the said plurality of rings, whose inner diameter is normally less than the outer diameter of said plurality of rings, the chamber in the container being greater in diameter than the outer diameter of the single split ring and the length of the chamber being such that when the container is seated in the recess therefor the rings are held from longitudinal movement on the rod.

7. The combination with a shaft or rod and a packing box, of a chambered nut or container on the shaft within the box, a plurality of split rings of spring material on the shaft within the container, and a single split ring of spring material inclosing the plurality of rings; said chamber being of such length that when the container is seated in the box the end wall of the chamber seats against the rings.

8. A metallic packing for shafts, rods, etc., comprising a plurality of split rings on the shaft formed of spring metal, a single split ring of spring metal inclosing said plurality of rings whose inner diameter is less than the outer diameter of said plurality of rings, and a chambered container on the shaft inclosing the rings, the chamber being of such length that when the container is seated against the wall through which the shaft passes the end wall of the chamber seats against the rings and seats the rings against the wall.

9. The combination with a shaft or rod and packing box, of a chambered container on the shaft within the box, a plurality of split rings of spring material on the shaft within the container whose normal inner diameter is less than the diameter of the shaft, and a single split ring of spring material inclosing the plurality of rings, said chamber being of such length that when seated in the box the end wall thereof engages the rings.

10. In a metallic packing for shafts etc., a plurality of split rings on the shaft formed of spring metal whose normal inner diameter is less than the diameter of the shaft, and a single split ring of imperforate spring material inclosing said plurality of rings.

11. In a metallic packing for shafts and the like, a plurality of split rings on the shaft formed of spring metal whose normal inner diameter is less than the diameter of the shaft and a single split ring of imperforate spring material inclosing said plurality of rings whose normal inner diameter is less than the outer diameter of said plurality of rings.

12. The combination with a shaft or rod and a packing box, of a chambered nut or container on the shaft within the box, a plurality of split rings of spring metal on the shaft within the nut or container whose normal inner diameter is less than the diameter of the shaft, and a single split ring of imperforate spring material inclosing the plurality of rings whose normal inner diameter is less than the outer diameter of said plurality of rings; said chamber being greater in diameter than the outer diameter of the single ring and being of such length that when the container is seated in the box the end wall of the chamber engages the rings.

In testimony whereof, we sign this specification in the presence of two witnesses.

VICTOR E. NELSON.
REYNOLD G. NELSON.

Witnesses:
ALFRED T. HARROW,
CHARLES E. WISNER.

---

Copies of this patent may be obtained for five cents each, by addressing the "Commissioner of Patents, Washington, D. C."

Correction in Letters Patent No. 1,068,157.

It is hereby certified that the name of the first-mentioned assignee in Letters Patent No. 1,068,157, granted July 22, 1913, upon the application of Victor E. Nelson and Reynold G. Nelson, of Detroit, Michigan, for an improvement in "Metallic Packing," was erroneously written and printed "Alfred F. Harrow" whereas said name should have been written and printed *Alfred T. Harrow;* as shown by the records of assignments in this office; and that the said Letters Patent should be read with this correction therein that the same may conform to the record of the case in the Patent Office.

Signed and sealed this 2nd day of September, A. D., 1913.

[SEAL.] THOMAS EWING,
*Commissioner of Patents.*